United States Patent

Yamashita et al.

[11] Patent Number: 5,849,661
[45] Date of Patent: Dec. 15, 1998

[54] AUTOMOTIVE EXHAUST CATALYST

[75] Inventors: Tetsuya Yamashita; Shinichi Takeshima, both of Susono; Toshiaki Tanaka, Numazu; Satomi Itakura, Suntou-gun, all of Japan

[73] Assignee: Toyota Jidosha Kabushiki Kaisha, Toyota, Japan

[21] Appl. No.: 613,524

[22] Filed: Mar. 11, 1996

[30] Foreign Application Priority Data

Mar. 10, 1995 [JP] Japan ..................................... 7-051405

[51] Int. Cl.$^6$ ............................. B01J 23/42; B01J 23/44; B01J 23/56; B01J 23/58
[52] U.S. Cl. .......................... 502/328; 502/330; 502/332; 502/333; 502/334; 502/344; 502/348
[58] Field of Search ..................................... 502/333, 328, 502/330, 332, 334, 344, 348

[56] References Cited

FOREIGN PATENT DOCUMENTS

| 0 589 393 A2 | 3/1994 | European Pat. Off. . |
| 0 604 987 A1 | 7/1994 | European Pat. Off. . |
| 0 685 258 A1 | 12/1995 | European Pat. Off. . |
| 4334763 A1 | 4/1994 | Germany . |
| A-5-317652 | 12/1993 | Japan . |

Primary Examiner—Wayne Langel
Attorney, Agent, or Firm—Oliff & Berridge, PLC

[57] ABSTRACT

An automotive exhaust catalyst includes an alumina support having pores, an $NO_x$ storage member loaded in the pores having a pore diameter of from 10 to 30Å at least, and a noble metal element loaded on the alumina support. The automotive exhaust catalyst can store $NO_x$ in a large amount in fuel-lean or oxygen-rich atmosphere, and inhibit the alumina support from sintering, because the $NO_x$ storage member is loaded in a highly dispersed manner.

10 Claims, No Drawings

AUTOMOTIVE EXHAUST CATALYST

BACKGROUND OF THE INVENTION

1. Field of the Invention

The present invention relates to a catalyst for purifying exhaust gases which are emitted from internal combustion engines of automobiles, or the like. Specifically, it relates to the catalyst on which a nitrogen oxides ($NO_x$) storage member is loaded. The $NO_x$ storage member is capable of storing and releasing $NO_x$ included in exhaust gases.

2. Description of Related Art

As catalysts for purifying automotive exhaust gases, there have been employed 3-way catalysts so far which oxidize CO and HC and simultaneously reduce $NO_x$. For example, the 3-way catalysts have been known widely which comprise a thermal resistant support formed of cordierite, a porous carrier layer formed of γ-alumina and disposed on the support, and a noble metal element selected from the group consisting of platinum (Pt), palladium (Pd) and rhodium (Rh) loaded on the carrier layer.

From the viewpoint of the global environment protection, carbon dioxide ($CO_2$), which is emitted from internal combustion engines of automobiles, or the like, is at issue. In order to reduce the carbon dioxide, so-called lean-burn engines are regarded promising. In lean-burn engines, the air-fuel mixture is lean-burned in oxygen-rich atmosphere. The fuel consumption can be reduced because lean-burn engines consume the fuel less. Accordingly, the carbon dioxide, which is emitted from lean-burn engines as one of the burned exhaust gases, is inhibited from generating.

The conventional 3-way catalysts simultaneously purify CO, HC and $NO_x$, produced by burning an air-fuel mixture whose air-fuel ratio is controlled at the theoretical air-fuel ratio (i.e., the stoichiometric point). Consequently, the conventional 3-way catalysts do not have enough activity to remove $NO_x$ in oxygen-rich atmosphere (or in fuel-lean atmosphere). Thus, it has been desired to successfully develop an automotive exhaust catalyst and a purifying system which can effectively purify $NO_x$ in oxygen-rich atmosphere (or in fuel-lean atmosphere).

Under the circumstances, the applicants of the present invention filed the following patent applications with the Japanese Patent Office. For example, Japanese Unexamined Patent Publication (KOKAI) No 5-317,652 discloses an automotive exhaust catalyst in which an $NO_x$ storage member, such as an alkaline-earth metal and an alkali metal, and Pt are loaded on a porous support including alumina, or the like. In this catalyst, the $NO_x$ storage member stores the $NO_x$ in fuel-lean atmosphere (or in oxygen-rich atmosphere), and releases the stored $NO_x$ at the stoichiometric point or in fuel-rich atmosphere (or in oxygen-lean atmosphere). The released $NO_x$ react with the reducing components, such as HC and CO. Thus, the catalyst can exhibit favorable $NO_x$ purifying performance even in fuel-lean atmosphere (or in oxygen-rich atmosphere).

However, in this conventional automotive exhaust catalyst with the $NO_x$ storage member loaded thereon, the $NO_x$ storage member reacts with alumina constituting the porous support to produce low-melting-point compounds after the conventional automotive exhaust catalyst is subjected to a durability test. Consequently, the alumina porous support is sintered to exhibit a decreased specific surface area and to have enclosed pores. As a result, the conventional automotive exhaust catalyst comes to exhibit deteriorated exhaust-gas-purifying performance.

SUMMARY OF THE INVENTION

The present invention has been developed in view of the aforementioned circumstances. It is an object of the present invention to provide an automotive exhaust catalyst whose exhaust-gas-purifying performance is inhibited from degrading even after it is subjected to a durability test.

In accordance with an aspect of the present invention, a catalyst is provided which can achieve the aforementioned object. In one aspect of the present invention, an automotive exhaust catalyst comprises:

an alumina support having pores;

an $NO_x$ storage member loaded in the pores having a pore diameter of from 10 to 30 Å at least; and a noble metal element loaded on the alumina support.

In another aspect of the present invention, it is preferred that the $NO_x$ storage member is at least one element selected from the group consisting of alkali metals, and is loaded in the pores in an amount of $1.1 \times 10^{-5}$ mol or less with respect to 1 $m^2$ surface area of the alumina support.

In still another aspect of the present invention, it is preferred that the $NO_x$ storage member is at least one element selected from the group consisting of alkaline-earth metals, and is loaded in the pores in an amount of $2.1 \times 10^{-5}$ mol or less with respect to 1 $m^2$ surface area of the alumina support.

The alumina support is porous usually, and has a plurality of pores having a variety of diameters on the surface and in itself. According to an examination for the pore-diameter distribution, pores having a pore diameter of 30 Å or less occupy about half of the volume of the total pores. Converting the volume occupation into a surface area occupation, the pores having a pore diameter of 30 Å or less occupy about 90% of the surface area of the total pores.

In general, the $NO_x$ storage member is loaded on the alumina support in the following manner; namely: the alumina support is immersed in an $NO_x$-storage-member solution so as to absorb the solution. The alumina support with the solution absorbed is then dried and calcinated. However, it is difficult to load or impregnate the $NO_x$ storage member in the pores having a pore diameter of 30 Å or less by this solution-storage loading process. In fact, most of the $NO_x$ storage member is loaded or impregnated in the pores having a pore diameter of more than 30 Å thereby.

Thus, in the conventional automotive exhaust catalyst, most of the $NO_x$ storage member is little loaded in the pores having a pore diameter of 30 Å or less. In fact, the $NO_x$ storage member is loaded in the pores having a pore diameter of more than 30 Å locally in a high concentration. According to the surface-area conversion, such pores occupy the surface area only by about 10%. As a result, the $NO_x$ storage member is likely to react with the alumina support to cause the sintering of the alumina support.

On the other hand, in one aspect of the present automotive exhaust catalyst, the $NO_x$ storage member is loaded in the pores having a pore diameter of 10 Å or more. Accordingly, the $NO_x$ storage member is loaded in a highly dispersed manner; namely: it is hardly loaded locally in a high concentration. As a result, the $NO_x$ storage member is inhibited from reacting with the alumina support.

If the $NO_x$ storage member should be loaded in the pores having a pore diameter of from 10 to 30 Å, the $NO_x$-storage-member solution should be impregnated into the pores having a pore diameter of from 10 to 30 Å. In order to accomplish the impregnation, the following processes are available; namely: (1) a loading process utilizing an ultrasonic wave, (2) a loading process utilizing vacuum evacuation, (3) a boiling loading process, (4) a pressurized loading process, and (5) a depressurized loading process. Hereinafter, these processes will be described in detail.

(1) A Loading Process Utilizing an Ultrasonic Wave

An ultrasonic wave is irradiated to an $NO_x$-storage-member solution when an alumina support is immersed in the solution to absorb. As a result, the vibration of the ultrasonic wave helps the solution substitute for air trapped in the pores. Thus, the solution can impregnate into the pores having a pore diameter of from 10 to 30 Å. Accordingly, the $NO_x$ storage member can be loaded in the pores having a pore diameter of from 10 to 30 Å. It is preferable to irradiate an ultrasonic wave having a frequency of about 36 KHz to an $NO_x$-storage-member solution.

(2) A Process Utilizing Vacuum Evacuation

An alumina support is placed under a vacuum of about 1 Torr or less in order to evacuate air trapped in the pores from the pores. Under the vacuum, the alumina support is brought into contact with an $NO_x$-storage-member solution. Thus, the solution can impregnate into the pores having a pore diameter of from 10 to 30 Å. Accordingly, the $NO_x$ storage member can he loaded in the pores having a pore diameter of from 10 to 30 Å.

(3) A Boiling Loading Process

An alumina support is immersed in a solvent for dissolving an $NO_x$ storage member. Then, the solvent is boiled in order to replace air trapped in the pores of the alumina support with the vaporized solvent. As a result, the pores are wetted by the vaporized solvent. When the pores are wetted, the boiling is terminated, and an $NO_x$ storage member is added to the solvent The concentration of the added $NO_x$ storage member is adjusted so that the $NO_x$ storage member can diffuse in the solvent which is condensed in the pores. Accordingly, the $NO_x$ storage member can be loaded in the pores having a pore diameter of from 10 to 30 Å.

(4) A Pressurized Loading Process

An $NO_x$-storage-member solution is pressurized to dozens of atm when an alumina support is immersed in the solution to absorb. As a result, air trapped in the pores is compressed so as to allow the solution come into the pores. Thus, even the wall of the pores having a pore diameter of from 10 to 30 Å is wetted by the $NO_x$-storage-member solution. Accordingly, the $NO_x$ storage member can be loaded in the pores having a pore diameter of from 10 to 30 Å.

(5) A Depressurized Loading Process

An entire system holding an $NO_x$-storage-member solution and an alumina support therein is depressurized to about $10^{-2}$ Torr when the alumina support is immersed in the solution to absorb. As a result, air trapped in the pores is expanded. The air coming out of the pores is evacuated as bubbles. Thereafter, the pressure of the depressurized system is put back into ordinary pressure. Thus, by the pressure difference, the solution impregnates into the pores by a volume of the evacuated air. Accordingly, the $NO_x$-storage-member solution can impregnate into the pores having a pore diameter of from 10 to 30 Å, and thereby the $NO_x$ storage member can be loaded in the pores having a pore diameter of from 10 to 30 Å.

Note that processes (1) through (5) described above can be carried out independently, or some of them can be combined to accomplish the objective.

When the $NO_x$ storage member is an alkali metal, it is preferred that the alkali metal is loaded in an amount of $1.1\times10^{-5}$ mol or less with respect to 1 $m^2$ surface area of the alumina support. When the alkali metal is loaded in an amount of more than $1.1\times10^{-5}$ mol with respect to 1 $m^2$ surface area of the alumina support, the alkali metal may be loaded locally in a high concentration on the alumina support. In a durability test, the localized alkali metal may react with alumina to produce compounds which close the pores, and accordingly the resulting automotive exhaust catalyst may have deteriorated exhaust-gas purifying performance. In addition, the effective amount of the alkali metal may decrease so that the resulting automotive exhaust catalyst may have degraded $NO_x$ purifying performance. When the loading amount of the alkali metal is $1.1\times10^{-5}$ mol or less with respect to 1 $m^2$ surface area of the alumina support, the resulting automotive exhaust catalyst is free from the drawbacks, and has good exhaust-gas purifying performance even after it is subjected to a durability test.

When the $NO_x$ storage member is an alkaline-earth metal, it is preferred that the alkaline-earth metal is loaded in an amount of $2.1\times10^{-5}$ mol or less with respect to 1 $m^2$ surface area of the alumina support. When the alkaline-earth metal is loaded in an amount of more than $2.1\times10^{-5}$ mol with respect to 1 $m^2$ surface area of the alumina support, the alkaline-earth metal may be loaded locally in a high concentration on the alumina support. In a durability test, the localized alkaline-earth metal may react with alumina to produce compounds which close the pores, and accordingly the resulting automotive exhaust catalyst may have deteriorated exhaust-gas purifying performance. In addition, the effective amount of the alkaline-earth metal may decrease so that the resulting automotive exhaust catalyst may have degraded $NO_x$ purifying performance. When the loading amount of the alkaline-earth metal is $2.1\times10^{-5}$ mol or less with respect to 1 $m^2$ surface area of the alumina support, the resulting automotive exhaust catalyst is free from the drawbacks, and has good exhaust-gas purifying performance even after it is subjected to a durability test.

The noble metal element can be one or more noble metals selected from the group consisting of Pt, Pd, Rh, Ir, Ag and Au. The loading amount of the noble metal element preferably falls in a range of from 0.2 to 40 grams, further preferably from 1 to 20 grams, with respect to 100 grams of the porous alumina support. When the loading amount of the noble metal element is converted into a value with respect to a unit volume (e.g., 1 L) of an overall automotive exhaust catalyst, the value preferably falls in a range of from 0.24 to 48 grams, further preferably from 1.2 to 24 grams, with respect to 1 L of the resulting automotive exhaust catalyst.

When the loading amount of the noble metal element is increased more than the upper limit, the noble metal element cannot operate effectively, and accordingly the catalytic performance of the resulting automotive exhaust catalyst cannot be improved. When the loading amount of the noble metal element is decreased less than the lower limit, the resulting automotive exhaust catalyst cannot fully exhibit catalytic activity in practical applications.

The noble metal element can be loaded on the porous alumina support by using a solution of its chlorides, nitrates, or the like by a well-known loading process, such as an impregnation process, a spraying process, and a slurry mixing process.

The $NO_x$ storage member can be at least one element selected from the group consisting of alkali metals, alkaline-earth metals and rare-earth elements. The term "alkali metals" means elements of Group 1A in the periodic table of the elements. As for the alkali metals, it is possible to exemplify lithium (Li), sodium (Na), potassium (K), rubidium (Rb), cesium (Cs), and francium (Fr). The term "alkaline-earth metals" means elements of Group 2A in the periodic table of the elements. As for the alkaline-earth metals, it is possible to exemplify barium (Ba), beryllium (Be), magnesium (Mg), calcium (Ca), and strontium (Sr). The term "rare-earth elements" means scandium (Sc), yttrium (Y), lanthanum (La), and chemical elements with atomic numbers 58 to 71 (e.g., cerium (Ce), praseodymium (Pr), neodymium (Nd), and so on).

As having been described so far, in accordance with one aspect of the present invention, the $NO_x$ storage member can be loaded on the present automotive exhaust catalyst in a highly dispersed manner. Accordingly, even when the $NO_x$ storage member is loaded on the present automotive exhaust catalyst in a small amount, the present automotive exhaust catalyst stores $NO_x$ in a large amount, and inhibits its alumina support from sintering. As a result, the present automotive exhaust catalyst can maintain a high $NO_x$ storage capability and a high 3-way catalytic activity even after it is subjected to a durability test.

In accordance with another aspect and still another aspect of the present invention, the alumina support is unlikely to react with the $NO_x$ storage member in the resulting present automotive exhaust catalyst, and is inhibited from sintering even after the present exhaust catalyst is subjected to a durability test. As a result, the thus modified present automotive exhaust catalyst can further securely maintain the high $NO_x$ storage capability and the high 3-way catalytic activity even after it is subjected to a durability test.

DETAILED DESCRIPTION OF THE PRFFFRRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

A monolithic catalyst was prepared. The monolithic catalyst included a honeycomb-shaped monolithic support made from cordierite, a noble-metal-element loading layer made from γ-alumina, and Pt (i.e., a noble metal element) loaded on the noble-metal-element loading layer. Note that Pt was loaded in an amount of 0.2 grams with respect to a unit volume (e.g., 1 L) of the monolithic catalyst.

A barium carbonate aqueous solution having a predetermined concentration was prepared. While irradiating an ultrasonic wave having a wavelength of 36 KHz at an output of 200 W to the barium carbonate aqueous solution, the monolithic catalyst was immersed in the barium carbonate aqueous solution at ordinary temperature for 15 minutes. After taking the monolithic catalyst out of the aqueous solution, the monolithic catalyst was blown to blow away the aqueous solution in excess. Thereafter, the monolithic catalyst was dried at 120° C. for 1 hour, and calcined at 600° C. for 1 hour. A First Preferred Embodiment of the present automotive exhaust catalyst was thus prepared. Note that the loading amount of Ba was 0.2 mol with respect to 1 L of the monolithic catalyst.

The First Preferred Embodiment of the present automotive exhaust catalyst thus prepared was analyzed, and was verified that Ba was loaded in the pores having a pore diameter of 10 Å or more.

Second Preferred Embodiment

A monolithic catalyst identical with the one employed in the First Preferred Embodiment was put in a vacuum container. Then, the vacuum container was evacuated so as to produce a vacuum of 1 Torr or less. Thereafter, a barium carbonate aqueous solution was introduced into the evacuated vacuum container, and the monolithic catalyst was immersed in the barium carbonate aqueous solution for 15 minutes.

The vacuum in the vacuum container was then canceled, and put back to ordinary pressure. After taking the monolithic catalyst out of the aqueous solution, the monolithic catalyst was blown to blow away the aqueous solution in excess. Thereafter, the monolithic catalyst was dried at 120° C. for 1 hour, and calcined at 600° C. for 1 hour. A Second Preferred Embodiment of the present automotive exhaust catalyst was thus prepared. Note that the loading amount of Ba was 0.2 mol with respect to 1 L of the monolithic catalyst.

The Second Preferred Embodiment of the present automotive exhaust catalyst thus prepared was analyzed, and was verified that Ba was loaded in the pores having a pore diameter of 10 Å or more.

Third Preferred Embodiment

A monolithic catalyst identical with the one employed in the First Preferred Embodiment was immersed in an ion-exchange solution. Then, the ion-exchange solution was heated and boiled under ordinary pressure, and the monolithic catalyst was held in the boiling ion-exchange solution for 15 minutes. After cooling the ion-exchange solution to room temperature, a barium carbonate aqueous solution having a predetermined concentration was dropped into the ion-exchange solution holding the monolithic catalyst therein. While dropping the barium carbonate aqueous solution, the ion-exchange solution was stirred. After dropping the barium carbonate aqueous solution and adjusting the concentration of barium carbonate to a specific value in the ion-exchange solution, the monolithic catalyst was kept being immersed in the ion-exchange solution for another 15 minutes.

After taking the monolithic catalyst out of the aqueous solution, the monolithic catalyst was blown to blow away the ion-exchange solution in excess. Thereafter, the monolithic catalyst was dried at 120° C. for 1 hour, and calcined at 600° C. for 1 hour. A Third Preferred Embodiment of the present automotive exhaust catalyst was thus prepared. Note that the loading amount of Ba was 0.2 mol with respect to 1 L of the monolithic catalyst.

The Third Preferred Embodiment of the present automotive exhaust catalyst thus prepared was analyzed, and was verified that Ba was loaded in the pores having a pore diameter of 10 Å or more.

Fourth Preferred Embodiment

A monolithic catalyst identical with the one employed in the First Preferred Embodiment was put in a pressure container together with a barium carbonate aqueous solution having a predetermined concentration. Thus, the monolithic catalyst was immersed in the barium carbonate aqueous solution. While holding the immersed state, the pressure container was pressurized to 100 atm therein. The pressurized state was kept for 15 minutes. Note that it is preferable to pressurize the pressure container to a couple dozens atm or more.

The pressure container was then depressurized to ordinary pressure. After taking the monolithic catalyst out of the aqueous solution, the monolithic catalyst was blown to blow away the aqueous solution in excess. Thereafter, the monolithic catalyst was dried at 120° C. for 1 hour, and calcinated at 600° C. for 1 hour. A Fourth Preferred Embodiment of the present automotive exhaust catalyst was thus prepared. Note that the loading amount of Ba was 0.2 mol with respect to 1 L of the monolithic catalyst The Fourth Preferred Embodiment of the present automotive exhaust catalyst thus prepared was analyzed, and was verified that Ba was loaded in the pores having a pore diameter of 10 Å or more.

Fifth Preferred Embodiment

A monolithic catalyst identical with the one employed in the First Preferred Embodiment was put in a vacuum container together with a barium carbonate aqueous solution having a predetermined concentration. Thus, the monolithic catalyst was immersed in the barium carbonate aqueous solution. While holding the immersed state, the vacuum container was depressurized to $10^{-2}$ Torr therein. The depressurized state was kept for 10 minutes. The vacuum container was then pressurized to ordinary pressure, and kept under ordinary pressure for 5 minutes.

After taking the monolithic catalyst out of the aqueous solution, the monolithic catalyst was blown to blow away the aqueous solution in excess. Thereafter, the monolithic catalyst was dried at 120° C. for 1 hour, and calcinated at 600° C. for 1 hour. A Fifth Preferred Embodiment of the present automotive exhaust catalyst was thus prepared. Note that the loading amount of Ba was 0.2 mol with respect to 1 L of the monolithic catalyst.

The Fifth Preferred Embodiment of the present automotive exhaust catalyst thus prepared was analyzed, and was verified that Ba was loaded in the pores having a pore diameter of 10 Å or more.

Comparative Example No 1

A monolithic catalyst identical with the one employed in the First Preferred Embodiment was immersed in a barium carbonate aqueous solution having a predetermined concentration at ordinary temperature under ordinary pressure for 15 minutes. After taking the monolithic catalyst out of the aqueous solution, the monolithic catalyst was blown to blow away the aqueous solution in excess. Thereafter, the monolithic catalyst was dried at 120° C. for 1 hour, and calcinated at 600° C. for 1 hour. An automotive exhaust catalyst identified with Comparative Example No. 1 was thus prepared. Note that the loading amount of Ba was 0.2 mol with respect to 1 L of the monolithic catalyst.

Comparative Example No. 1 thus prepared was analyzed, and was verified that Ba was not loaded in the pores having a pore diameter of less than 30 Å.

Examination and Evaluation

Each of the automotive exhaust catalysts of the First through Fifth Preferred Embodiments and Comparative Example No. 1 was subjected to a durability test. In the durability test, an exhaust gast was flowed through each of the automotive exhaust catalysts at 800° C. for 2 hours. Note that the exhaust gas was made by burning an air-fuel mixture having a fuel-lean (i.e., oxygen-rich) A/F of 20. Before and after the durability test, each of the automotive exhaust catalysts was examined for their specific surface area by using the BET equation. The results of the examination are recited in Table 1 below in terms of specific-surface-area reduction rate.

After the durability test, each of the automotive exhaust catalysts was held in a reducing agent (e.g., propylene) at 600° C. for 10 minutes. Thus, each of the automotive exhaust catalysts was fully reduced. Then, an exhaust gast was flowed through each of the automotive exhaust catalysts for 20 minutes. Note that the exhaust gas was made by burning an air-fuel mixture having a fuel-lean (i.e., oxygen-rich) A/F of 20, and that its temperature was initially 600° C. at the inlet of the automotive catalysts, and reduced to room temperature in the 20-minute exhaust-gas exposure. In this way, the automotive exhaust catalysts were examined for how much they stored $NO_x$ in the 20-minute exhaust-gas exposure. The results of the examination are also recited in Table 1 below.

TABLE 1

|  | Specific-Surface-Area Reduction Rate (%) | Amount of Stored $NO_x$ (mg) |
|---|---|---|
| 1st Pref. Embodiment | 77 | 199 |
| 2nd Pref. Embodiment | 75 | 204 |
| 3rd Pref. Embodiment | 80 | 187 |
| 4th Pref. Embodiment | 79 | 192 |
| 5th Pref. Embodiment | 78 | 190 |
| Comp. Ex. No. 1 | 85 | 155 |

It is understood from Table 1 that the automotive exhaust catalysts of the First through Fifth Preferred Embodiments stored much more $NO_x$ than the automotive exhaust catalyst of Comparative Example No. 1 did. Hence, it is apparent that the automotive exhaust catalysts of the First through Fifth Preferred Embodiments were superior to that of Comparative Example No. 1 in terms of the $NO_x$ storage capability after the durability test.

It is also appreciated from Table 1 that the specific surface areas of the automotive exhaust catalysts of the First through Fifth Preferred Embodiments were degraded less than that of Comparative Example No. 1 did after the durability test. Therefore, it is evident that, in the automotive exhaust catalysts of the First through Fifth Preferred Embodiments, the pores of the honeycomb-shaped monolithic supports were kept from closing.

Thus, in the automotive exhaust catalysts of the First through Fifth Preferred Embodiments, the $NO_x$ storage member was loaded in the fine pores having a pore diameter of from 10 to 30 Å in a highly dispersed manner. Hence, it is believed that they were less likely to suffer from the sintering, and that they consequently exhibited improved $NO_x$ storage performance.

Sixth Preferred Embodiments

The Sixth Preferred Embodiments of the present automotive exhaust catalyst were prepared in the same manner as the First Preferred Embodiment except the following arrangements; namely: instead of the barium carbonate aqueous solution, a potassium carbonate aqueous solution, a cesium carbonate aqueous solution, and a calcium carbonate aqueous solution were employed as the $NO_x$ storage-member aqueous solution, and the loading amounts of the metallic elements were diversified as set forth in Table 2 below. Thus, a monolithic catalyst identical with the one employed in the First Preferred Embodiment was immersed in each of the aqueous solutions while irradiating the ultrasonic wave to the aqueous solutions, and accordingly the alkali metal or alkaline-earth metal was loaded on the monolithic catalyst in a highly dispersed tanner in the loading amounts as set forth in Table 2.

Note that the loading amounts were diversified by varying the metallic element concentration in the aqueous solutions, and that they were determined by measuring the absorbed amount of the aqueous solutions.

Each of the resulting automotive exhaust catalysts was thermally treated in air at 800° C. for 2 hours. Then, an exhaust gast was flowed through each of the automotive exhaust catalysts for 2 hours. Note that the exhaust gas was made by burning an air-fuel mixture having a fuel-lean (i.e., oxygen-rich). A/F of 20, and that its temperature was 800° C., at the inlet of the automotive catalysts. In this way, the automotive exhaust catalysts were examined for how much they stored $NO_x$ in the 2-hour exhaust-gas exposure. The results of the examination are also recited in Table 2.

TABLE 2

| Loading Amount | NOx Storage Rate (%) | | | |
|---|---|---|---|---|
| Unit: mol with respect to 1 m² Alumina-Support Surface Area | Alkali Metal | | Alkaline-earth Metal | |
| | K | Cs | Ca | Ba |
| $0.07 \times 10^{-5}$ | 80 | 82 | 87 | 93 |
| $0.14 \times 10^{-5}$ | 89 | 86 | 100 | 100 |
| $0.35 \times 10^{-5}$ | 95 | 93 | 100 | 100 |
| $0.52 \times 10^{-5}$ | 100 | 100 | 100 | 100 |
| $0.78 \times 10^{-5}$ | 100 | 100 | 100 | 100 |
| $1.04 \times 10^{-5}$ | 100 | 100 | 100 | 100 |
| $1.30 \times 10^{-5}$ | 78 | 84 | 100 | 100 |
| $1.56 \times 10^{-5}$ | 36 | 74 | 100 | 100 |
| $2.08 \times 10^{-5}$ | 20 | 50 | 100 | 100 |
| $2.60 \times 10^{-5}$ | — | — | 68 | 72 |
| $3.12 \times 10^{-5}$ | — | — | 15 | 13 |

The following can he observed from Table 2; namely: when the $NO_x$ storage member was the alkali metals and was loaded in an amount of $1.1 \times 10^{-5}$ mol or less with respect to 1 m² of the alumina-support surface area, the automotive exhaust catalysts of the Sixth Preferred Embodiments exhibited a high $NO_x$ storage rate after the 2-hour exhaust-gas exposure; and when the $NO_x$ storage member was the alkaline-earth metals and was loaded in an amount of $2.1 \times 10^{-5}$ mol or less with respect to 1 m² of the alumina-support surface area, the automotive exhaust catalysts of the Sixth Preferred Embodiments exhibited a high $NO_x$ storage rate after the 2-hour exhaust-gas exposure.

It is believed that, when the loading amount of the $NO_x$ storage member is more than the aforementioned values, the $NO_x$ storage capability of the resulting automotive exhaust catalyst deteriorates because the $NO_x$ storage member reacts with the alumina support to degrade the alumina support.

Having now fully described the present invention, it will be apparent to one of ordinary skill in the art that many changes and modifications can be made thereto without departing from the spirit or scope of the present invention as set forth herein including the appended claims.

What is claimed is:

1. An automotive catalyst comprising:

an alumina support having pores having a diameter of at least 10 Å, wherein at least a first portion of said pores have a diameter of from 10 to 30 Å and at least a second portion of said pores have a diameter of greater than 30 Å;

an $NO_x$ storage member loaded in the pores having a diameter of at least 10 Å, wherein the amount of the $NO_x$ storage member loaded in all of said pores having a diameter of at least 10 Å is substantially uniform with respect to the surface area of said pores; and a noble metal element loaded on said alumina support.

2. The automotive exhaust catalyst according to claim 1, wherein said $NO_x$ storage member is at least one element selected from the group consisting of alkali metals, and is loaded in the pores in an amount of $1.1 \times 10^{-5}$ mol or less with respect to 1 m² surface area of said alumina support.

3. The automotive exhaust catalyst according to claim 1, wherein said $NO_x$ storage member is at least one element selected from the group consisting of alkaline-earth metals, and is loaded in the pores in an amount of $2.1 \times 10^{-5}$ mol or less with respect to 1 m² surface area of said alumina support.

4. The automotive exhaust catalyst according to claim 1, wherein said noble metal element is at least one element selected from the group consisting of Pt, Pd and Rh.

5. The automotive exhaust catalyst according to claim 1, wherein said noble metal element is loaded in an amount of from 0.2 to 40 grams with respect to 100 grams of said alumina support.

6. The automotive exhaust catalyst according to claim 1, wherein said $NO_x$ storage member is loaded by immersing said alumina support in an $NO_x$-storage-member solution while irradiating an ultrasonic wave to the $NO_x$-storage-member solution.

7. The automotive exhaust catalyst according to claim 1, wherein said $NO_x$ storage member is loaded by placing said alumina support under vacuum and bringing said alumina support into contact with an $NO_x$-storage-member solution.

8. The automotive exhaust catalyst according to claim 1, wherein said $NO_x$ storage member is loaded by immersing said alumina support in a solvent for dissolving said $NO_x$ storage member, boiling the solvent, terminating the boiling, and adding said $NO_x$ storage member to the solvent.

9. The automotive exhaust catalyst according to claim 1, wherein said $NO_x$ storage member is loaded by pressurizing an $NO_x$-storage-member solution holding said alumina support therein.

10. The automotive exhaust catalyst according to claim 1, wherein said $NO_x$ storage member is loaded by depressurizing an $NO_x$-storage-member solution holding said alumina support therein.

* * * * *